United States Patent [19]

Wiersing et al.

[11] Patent Number: 5,385,067

[45] Date of Patent: Jan. 31, 1995

[54] TURN SIGNAL CANCELLATION MECHANISM

[75] Inventors: Jeffrey K. Wiersing, Farmington Hills; LeRoy A. Poleschuk, White Lake; David Guerra, Rockwood, all of Mich.

[73] Assignee: United Technologies Automotive, Inc., Dearborn, Mich.

[21] Appl. No.: 120,676

[22] Filed: Sep. 13, 1993

[51] Int. Cl.⁶ .............................................. H01H 3/16
[52] U.S. Cl. .................................. 74/484 R; 200/61.35
[58] Field of Search .................... 74/484 R; 200/61.35

[56] References Cited

U.S. PATENT DOCUMENTS 5,030,802 7/1991 Noro .................... 200/61.35 X

*Primary Examiner*—Allan D. Herrmann
*Attorney, Agent, or Firm*—Harness, Dickey & Pierce

[57] ABSTRACT

A turn signal cancellation mechanism is comprised of a handle, an actuator, a pawl and a biasing means. An engagement segment of the actuator has a modified T-shaped slot formed therein. The pawl is defined by a base having an arm projecting in an offset manner therefrom. A post is mounted perpendicularly upon the arm opposite from the base. The pawl is slidably juxtapositioned within the actuator such that the post of the pawl engagably extends through the modified T-shaped slot within the actuator.

25 Claims, 10 Drawing Sheets

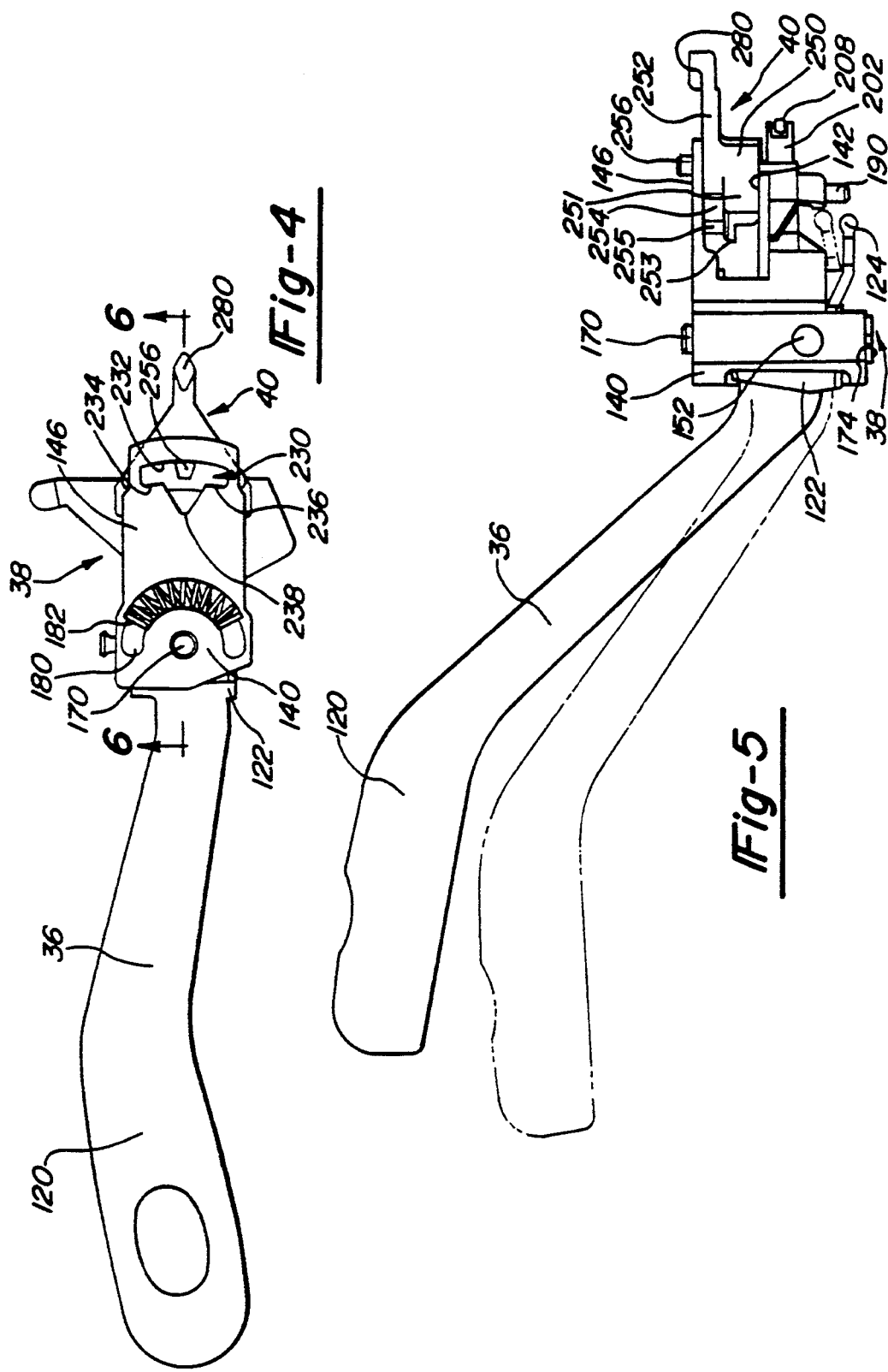

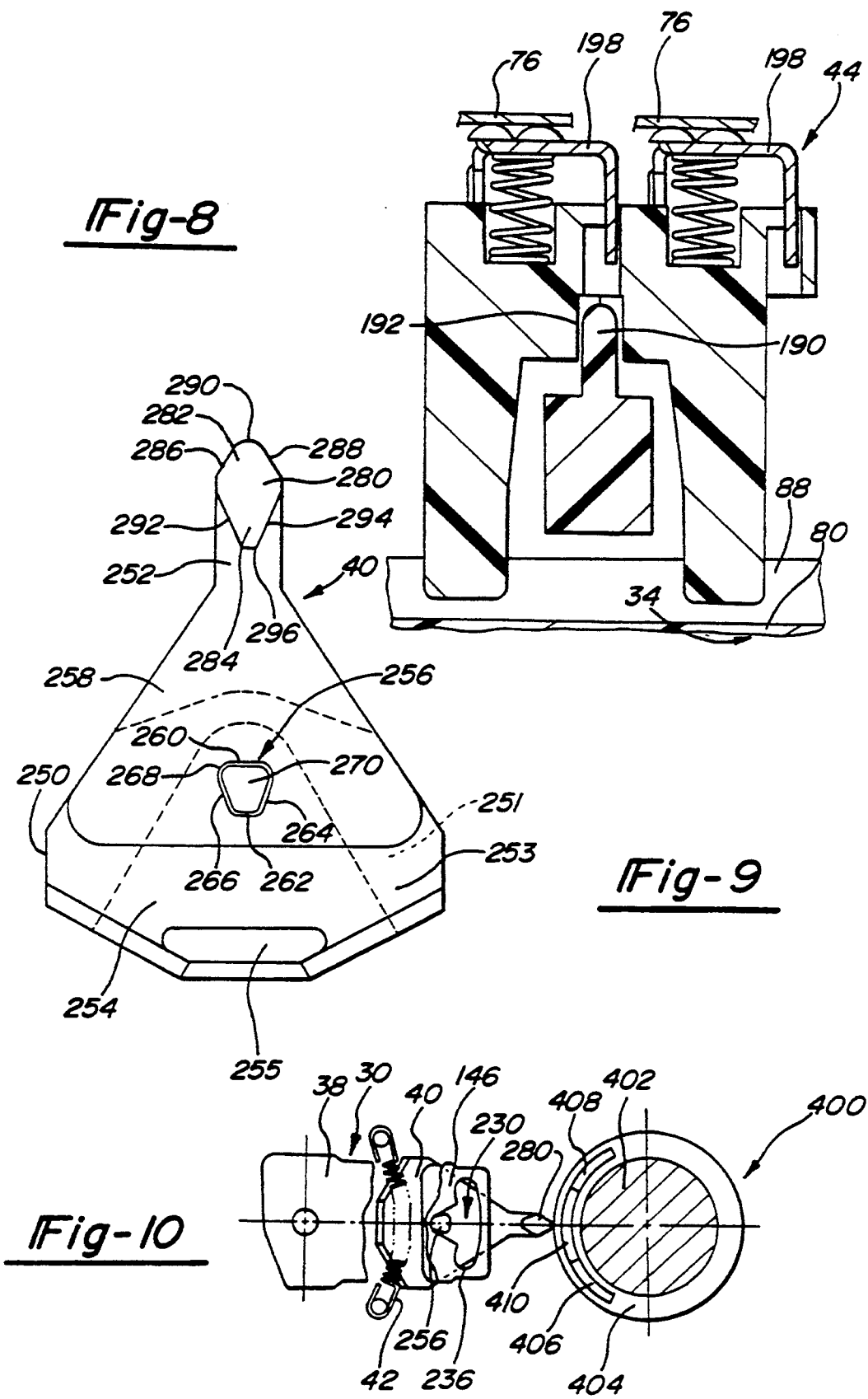

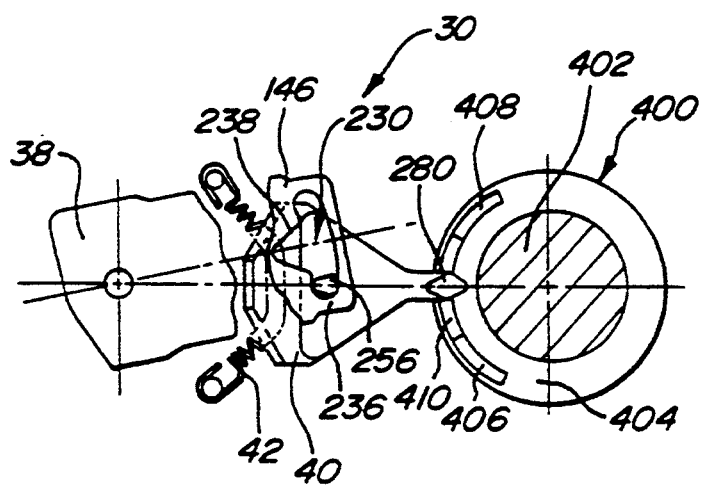
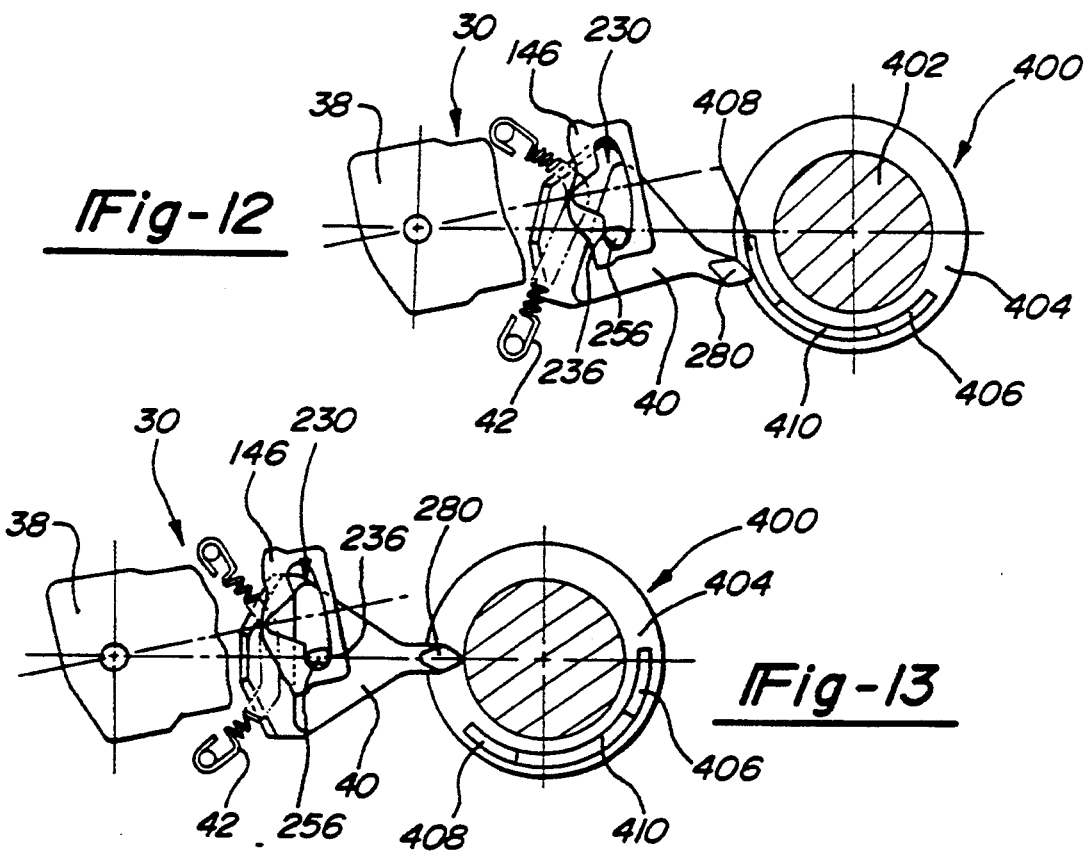

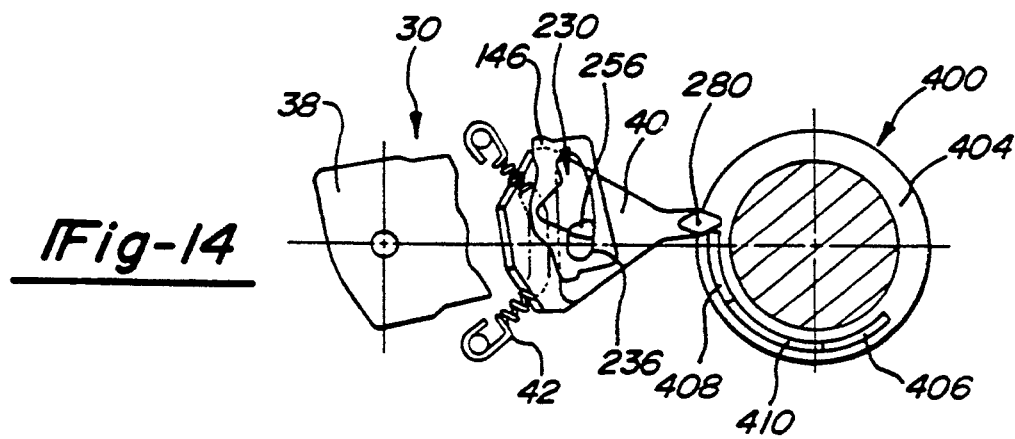
_Fig-14_
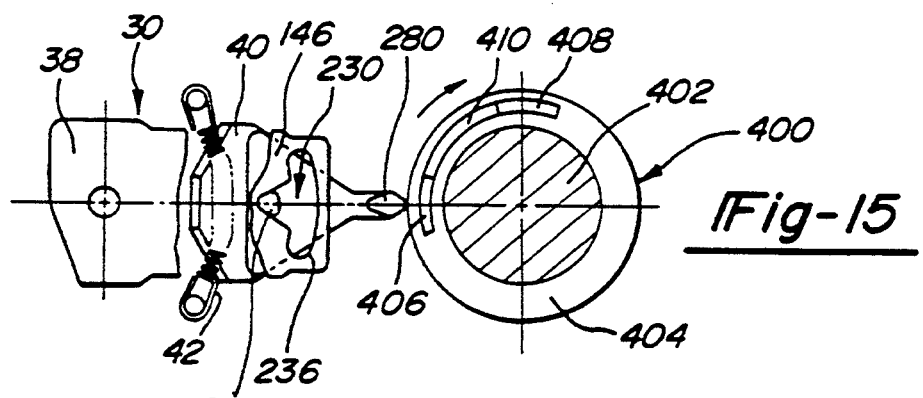
_Fig-15_
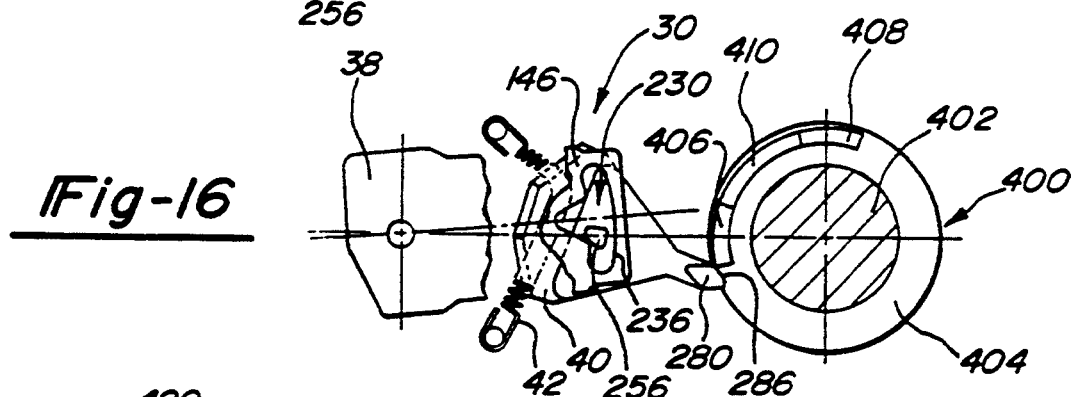
_Fig-16_
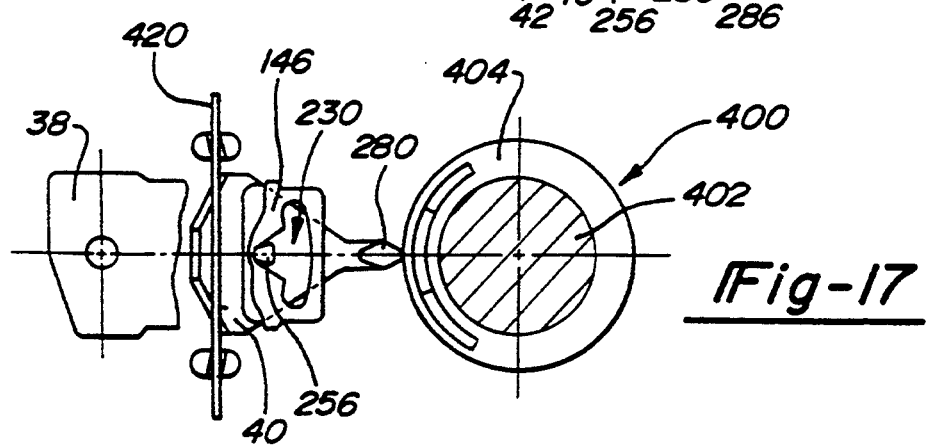
_Fig-17_

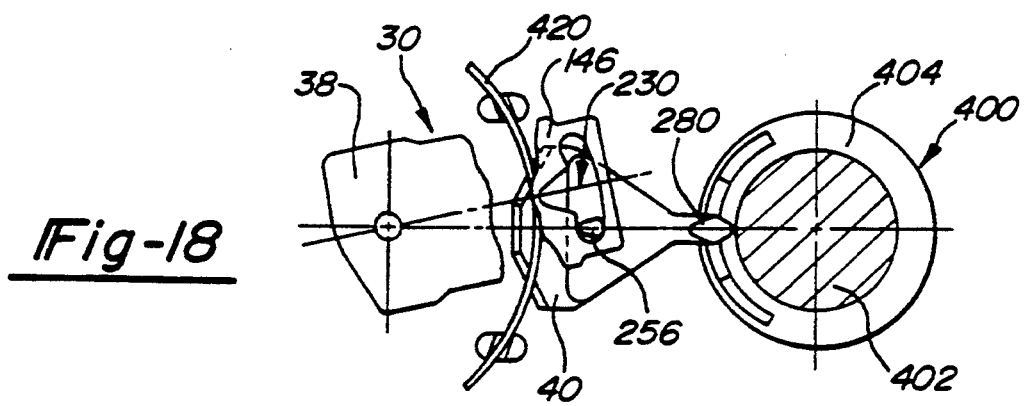
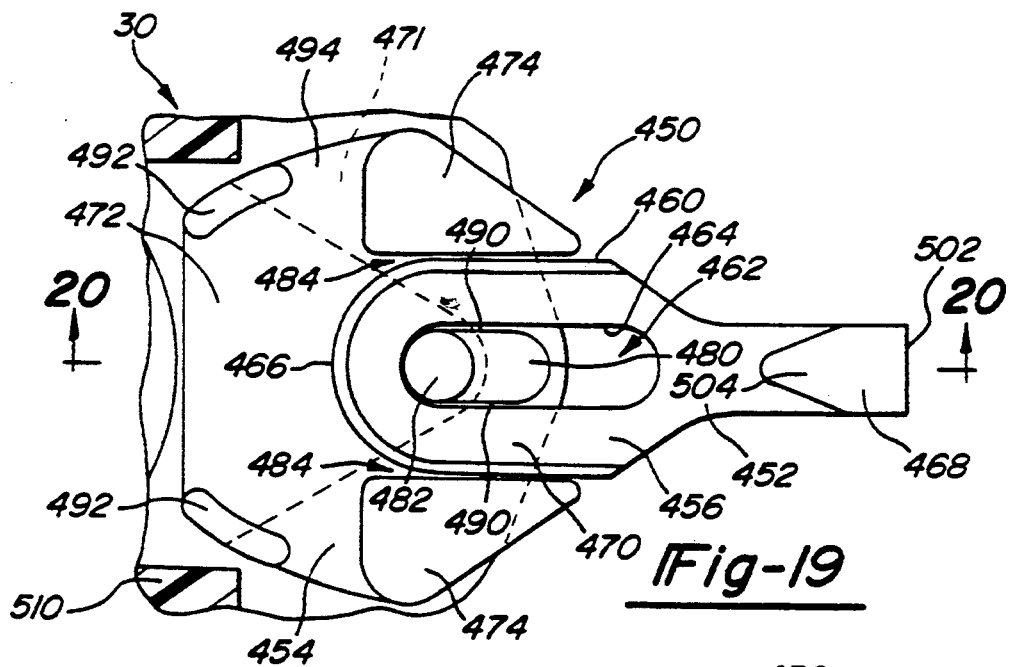
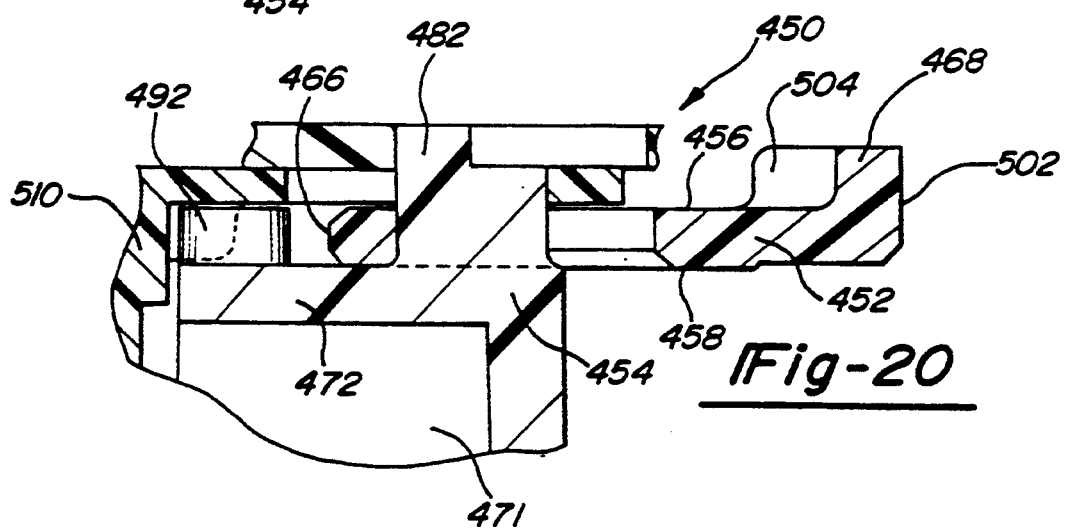

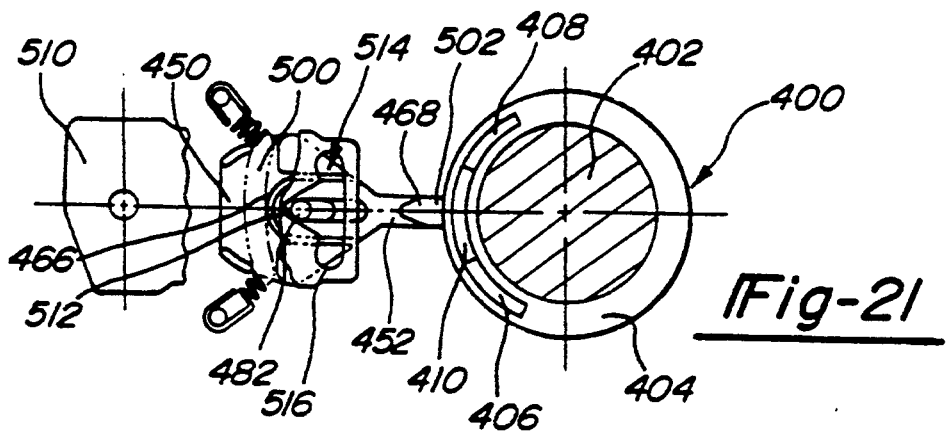
*Fig-21*
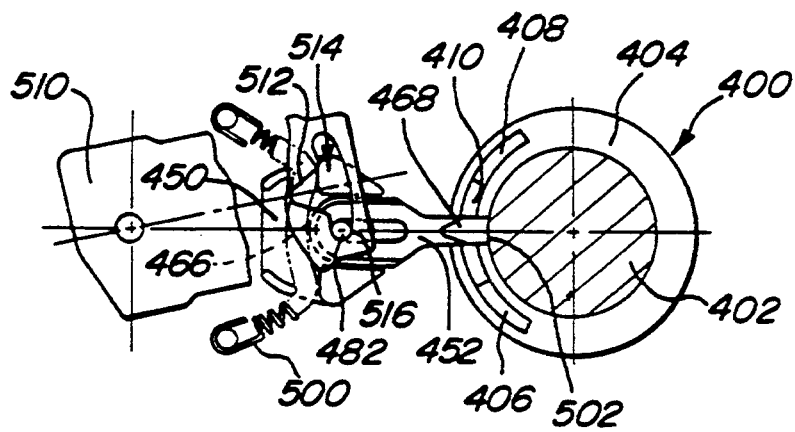
*Fig-22*
*Fig-23*

TURN SIGNAL CANCELLATION MECHANISM

BACKGROUND OF THE INVENTION

This invention relates generally to turn signal cancellation mechanisms for automotive vehicles and specifically to a turn signal cancellation mechanism having an actuator and pawl therein.

In most automotive vehicles, it is common to have a turn signal cancellation mechanism which contains electrical switching components and functionally interfaces with a steering shaft assembly. Virtually all such mechanisms have a casing upon which a handle is pivotably mounted. This casing is usually disposed on the steering column such that various internal members can engage the steering shaft assembly. When a turn is to be made, the handle is pivoted in the direction of turning and is then engaged into a detented position where it remains latched until after the turn has been completed. After the turn has been completed, the switch is canceled and the handle is allowed to return to its original neutral position. Additionally, a variety of other electrical accessories, such as hazard lamp switches and windshield wiper switches, may be incorporated within the turn signal handle and casing.

There are many traditional constructions for these turn signal cancellation mechanisms and switches. One such device is configured from a pivoting handle and actuator which work in conjunction with a pawl and extension spring. The actuator has a pair of outwardly extending arms generally forming a semi-circle upon which the pawl is mounted to span therebetween. Furthermore, a spring loaded detent finger is affixed upon an end of each arm of the actuator for engagement with an adjacent one of a pair of detent formations formed within the outer casing. Moreover, the pawl has two enlarged half-moon-shaped wings projecting outwardly from a central cavity within which is a spring loaded plunger. Each wing is pivotably movable by engagement with an adjacent arm of the actuator. The extension spring engages the pawl central cavity proximate with the exposed portion of the plunger. Moreover, a cylindrical post projects from the central cavity of the pawl perpendicular to a plane defined by the wings and engages an adjacent portion of the casing. The post guides the linear movement of the pawl in relation to the casing. While this construction is an improvement in the art, it is large to package and requires a multitude of components, thus, necessitating extraneous assembly operations and additional cost.

Other conventional constructions are disclosed in the following U.S. Pat. No. 4,900,946 entitled "Multi-Function Switch for Automotive Vehicles," which issued to Williams et al. on Feb. 13, 1990; U.S. Pat. No. 4,840,078 entitled "Steering Device for Vehicles," which issued to Shitanoki on Jun. 20, 1989; U.S. Pat. No. 4,426,951 entitled "Turn Signal Cancellation Apparatus for Use with Steering Wheel and Shaft Assembly," which issued to Nishizima on Jan. 24, 1984; and, U.S. Pat. No. 3,914,566 entitled "Turn Signal and Hazard Warning Switch," which issued to Wendling on Oct. 21, 1975, all of which are incorporated by reference herewithin. In general, most traditional turn signal cancellation mechanisms are difficult to actuate while the vehicle is engaged in a gentle turn in a first direction when the vehicle operator desires to make a sharp turn in a second and opposite direction. These mechanisms will usually be prematurely canceled by the turned steering shaft assembly and prevent the desired pivoted and detented actuation of the device.

Accordingly, a turn signal cancellation mechanism is desired which is compactly packaged, contains fewer parts, can be cost effectively produced and assembled, and which can bypass the automatic cancellation feature.

SUMMARY OF THE INVENTION

In accordance with the present invention, a preferred embodiment of a new and useful turn signal cancellation mechanism is comprised of a handle, an actuator, a pawl and a biasing means. The actuator is attached to the handle. Furthermore, an engagement segment extends from the actuator and has a modified T-shaped slot formed therein. The modified T-shaped slot is defined by a pair of oppositely extending upper legs and a center leg protruding perpendicular therefrom.

The pawl has a base with an arm projecting in an offset manner therefrom with a post mounted perpendicularly thereupon. Furthermore, the arm has an interface member proximate with a distal end thereof and the pawl also has a channel running transversely thereacross. The pawl is slidably juxtapositioned within the actuator such that the arm of the pawl is proximate with the engagement segment of the actuator. Moreover, the post of the pawl engagably extends through the modified T-shaped slot within the actuator. Additionally, the cover has an elongated slot therein within which the post is also slidably located. The biasing means is partially juxtapositioned within the channel of the pawl and urges the pawl into positional association corresponding with the legs of the modified T-shaped slot of the actuator. In the preferred embodiment, the arm, interface member, base, and post are integrally formed as a single part. In an alternate embodiment, the arm of the pawl is linearly translatable independent from the base.

The turn signal cancellation mechanism of the present invention is advantageous over the prior art constructions in that it translates rotational movement of the handle into both rotational and linear movement of the pawl in relation to a steering shaft assembly within an automotive vehicle. The present invention also combines the many conventional and difficult to assembly components into a few parts that are easily assembled and are produced at a low cost. Furthermore, the present invention can be packaged into a compact space and can be installed within many existing steering systems. Moreover, the turn signal cancellation mechanism of the present invention requires lower operating efforts but gives a more precise and crisp feel due to the specific interfaces between the pawl and the receptacle acting in coordination with a simplified detenting system. Another significant advantage is that the present invention provides for a manual override of the automatic cancellation feature such that the turn signal can be actuated when the steering wheel is in an oppositely turned position.

Additional advantages and features of the present invention will become apparent from the following description and appended claims, taken in conjunction with the accompanying drawings.

BRIEF DESCRIPTION OF THE DRAWINGS

FIG. 4 is a side elevational view of a handle, actuator, pawl, cancel return spring and rivet of the present invention turn signal cancellation mechanism of FIG. 1;

FIG. 5 is a end elevational view of a cover, handle, actuator, pawl, detent finger assembly and rivet of the present invention turn signal cancellation mechanism of FIG. 1;

FIG. 8 is an enlarged sectional view, taken along line 8—8 of FIG. 3, of the present invention turn signal contactor and carrier mechanism;

FIG. 9 is an enlarged elevational view of the pawl of the present invention turn signal cancellation mechanism of FIG. 1;

FIGS. 10–16 are elevational views, with portions broken away therefrom, of the actuator, pawl and an extension spring of the present invention turn signal cancellation mechanism of claim 1 showing exemplary operating positions thereof;

FIGS. 17 and 18 are elevational views, similar to that of FIGS. 10–16, of an alternate embodiment leaf spring used to bias the pawl of the present invention turn signal cancellation mechanism showing exemplary operating positions thereof;

FIG. 19 is an enlarged elevational view, with a portion broken away therefrom, of the present invention turn signal cancellation mechanism of FIG. 1 showing an alternate embodiment of the pawl in relation to the actuator;

FIG. 20 is a sectional view, taken along line 20—20 of FIG. 19, of the alternate embodiment pawl and actuator of the present invention turn signal cancellation mechanism;

FIGS. 21–23 are elevational views, similar to FIGS. 10–16, of the alternate embodiment pawl of the present invention turn signal cancellation mechanism of FIG. 19 showing exemplary operating positions thereof.

DETAILED DESCRIPTION OF THE PREFERRED EMBODIMENT

Figure 1:
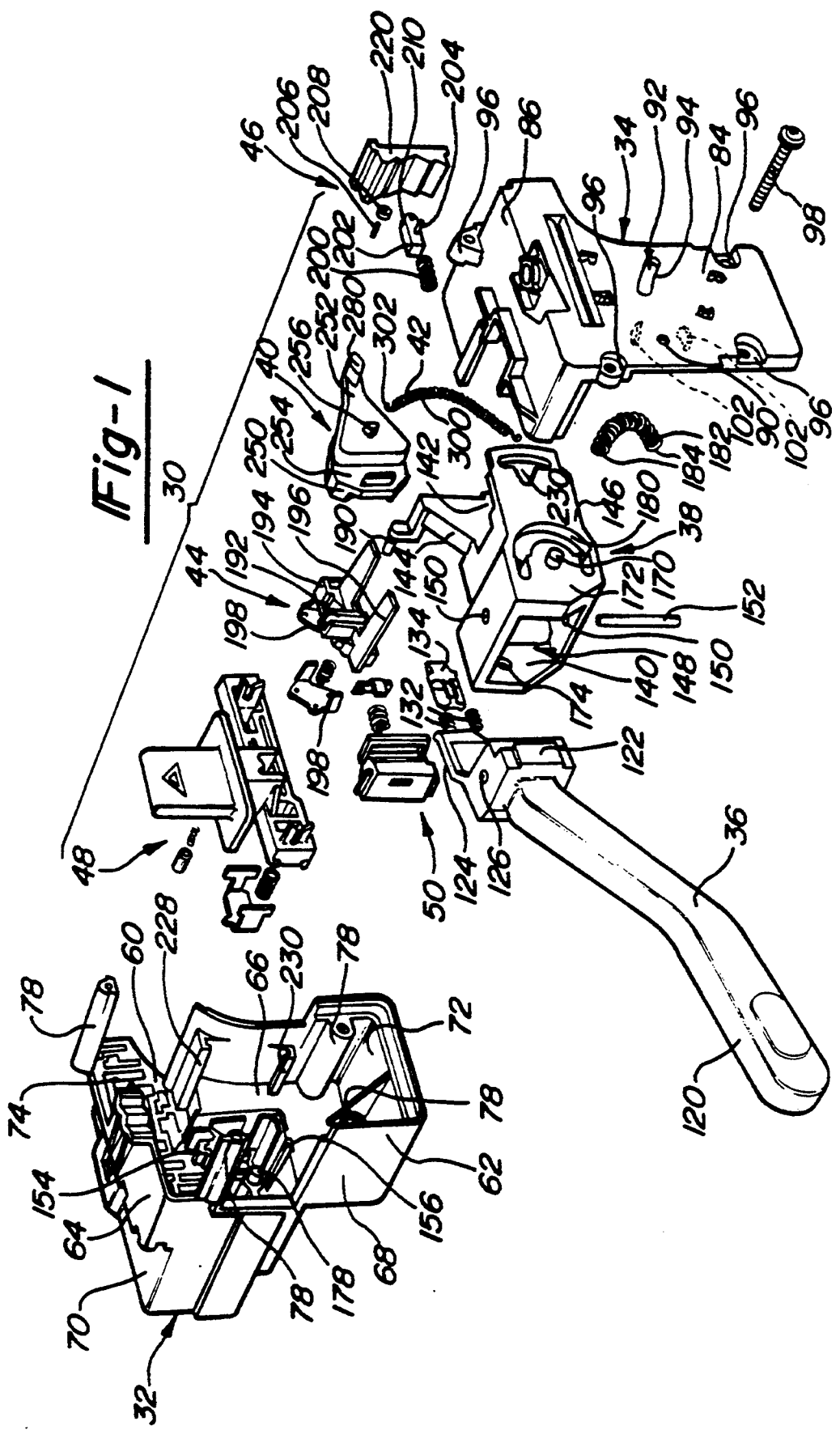
FIG. 1 is an exploded perspective view of a preferred embodiment of a turn signal cancellation mechanism of the present invention.
Figure 2:
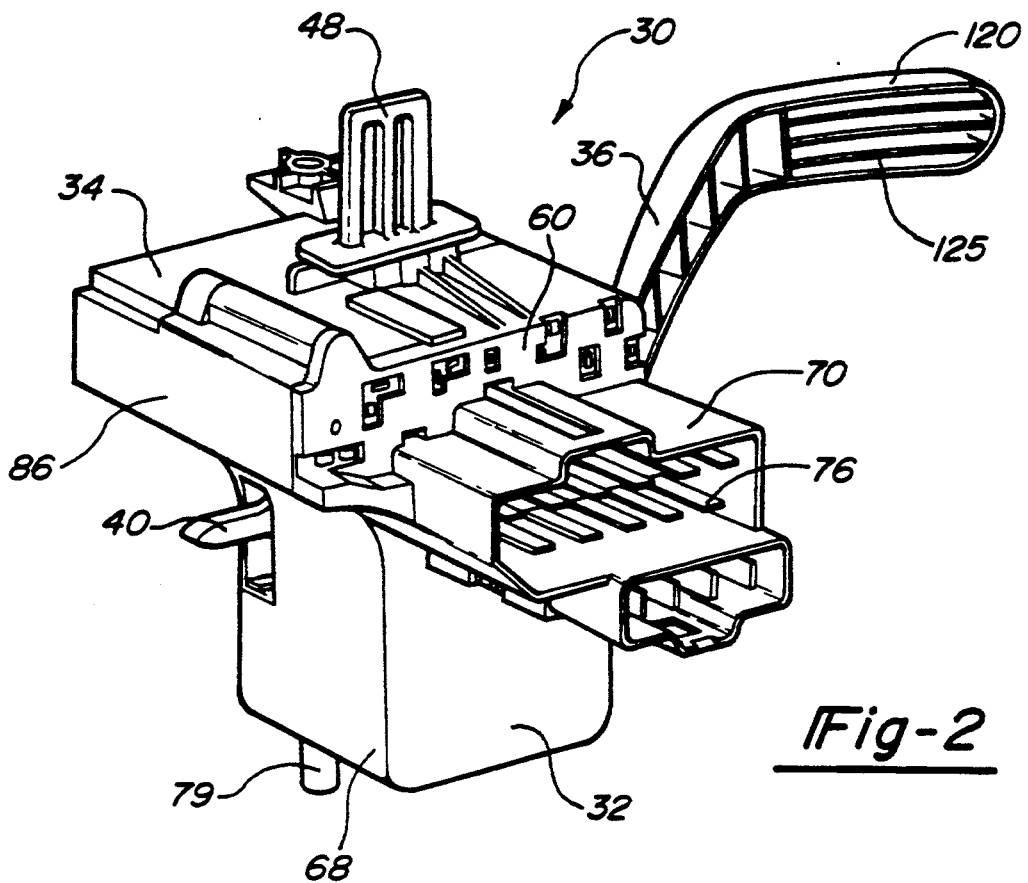
FIG. 2 is a perspective view, opposite from that of FIG. 1, of the present invention turn signal cancellation mechanism of FIG. 1.
Figure 3:
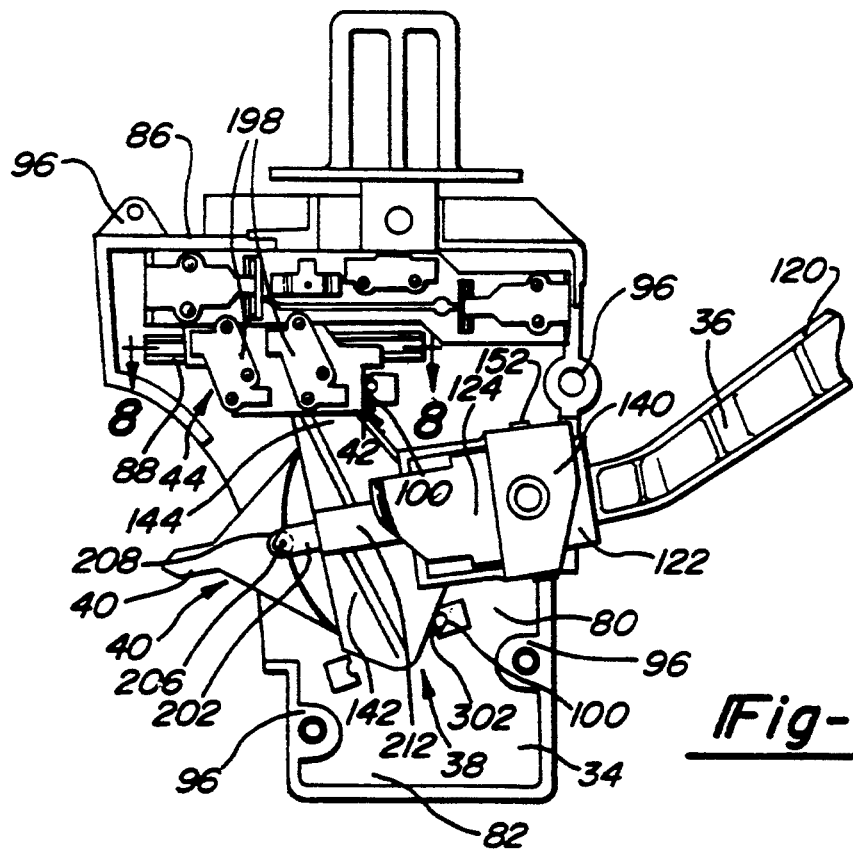
FIG. 3 is a side elevational view of the present invention turn signal cancellation mechanism of FIG. 1 with a body assembly removed.

A turn signal cancellation mechanism is typically constructed so as to be attached to the side of a steering column in an automotive vehicle such that various internal components of the turn signal cancellation mechanism can interface with a steering shaft assembly. This steering shaft assembly is rotatable when a vehicle operator moves a steering wheel attached to an end thereof. Referring to FIGS. 1 through 7, the preferred embodiment of a turn signal cancellation mechanism 30 of the present invention is comprised of a body assembly 32, a cover 34, a handle 36, an actuator 38, a pawl 40, an extension spring 42, a turn signal contactor and carrier assembly 44 and a turn signal detent assembly 46. In this exemplary embodiment, turn signal cancellation mechanism 30 further provides for various electrical accessories such as a hazard switch assembly 48 and a high beam—low beam headlamp switch assembly 50.

Body assembly 32 serves as both a protective covering and a functional supporting member. Body assembly 32 has a perforated wall 60 bordered by a J-shaped side wall 62 and an L-shaped side wall 64. Body assembly 32 further has an inside surface 66 and an outside surface 68 upon which an electrical connector receptacle 70 extends proximate with perforated wall 60. Body assembly 32 is further comprised of a shell 72 which is injection molded from a polymeric material such as mineral/glass reinforced nylon against which a plurality of copper stampings 74 are mounted. Many of these stampings 74 have blades 76 extending therefrom which pass through perforated wall 60 for attachment with a mating electrical connector (not shown). Accordingly, these stampings 74 serve to carry electrical current between the various switch components within turn signal cancellation mechanism 30. Body assembly 32 also has a plurality of attachment bosses 78 projecting congruently with side walls 62 and 64. Moreover, a pair of cylindrical locating bosses 79 project from J-shaped side wall 62.

Cover 34 has a median wall 80 defined by an inner surface 82 and an outer surface 84. Cover 34 further has an upper wall 86 surrounding a portion of the part's periphery. Median wall 80 of cover 34 also has an elongated and raised linear pocket 88 extending substantially perpendicular therefrom. Moreover, median wall 80 of cover 34 has a pivot hole 90 and an elongated slot 92 extending therethrough. Elongated slot 92 is defined by an inside edge 94 which has a pair of straight and parallel sides joined by a pair of semi-circular ends. Elongated slot 92 and hole 90 are linearly aligned with each other. Cover 34 has a plurality of fastening bosses 96 which are in registry with attachment bosses 78 of body assembly 32 when cover 34 and body assembly 32 are assembled to one another by a plurality of screws 98. Additionally, a pair of biasing means attachment structures 100 project perpendicularly from inner surface 82 of the cover's median wall 80 and are spatially disposed away from one another. Each attachment structure 100 has a cylindrical shaft portion capped by an enlarged head portion projecting from a distal end thereof. Surrounding hole 90, there are a pair of curved pillars 102 which are somewhat shorter in length than are attachment structures 100. As with shell 72 of body assembly 32, cover 34 is injection molded from mineral/glass reinforced nylon.

Handle 36 has a stalk portion 120, a coupling portion 122 and a lever arm 124. Handle 36 is injection molded from an ultraviolet stabilized type 6 nylon such that stalk 120 has a plurality of structural ribs 125 formed along the back side thereof. When assembled, stalk 120 is accessible to the vehicle operator for actuation of turn signal contactor and carrier assembly 44 as will be discussed in detail hereinafter. Coupling portion 122 has a cylindrical bore 126 extending transversely therethrough. Moreover, a cavity 128 is formed in an end 130 of coupling portion 122 wherein there are a pair of compression detent springs 132 and a wedge-shaped detent finger 134.

Actuator 38 is further comprised of a receptacle segment 140, a platform segment 142, an extension arm segment 144 and an engagement segment 146. Receptacle segment 140 has an inner cavity 148 within which coupling portion 122 of handle 36 fits. A pair of circular openings 150 extend transversely through receptacle segment 140 and are concentrically aligned with bore 126 of handle 36. An elongated cylindrical rivet 152 extends within bore 126 and openings 150 thereby pivotably joining coupling portion 122 of handle 36 to receptacle segment 140 of actuator 38. This pivoting action provides a means for driving switch assembly 50 which operably switches the vehicle headlamps (not shown) between a high beam and a low beam setting. This is achieved by lever arm 124 of handle 36 engagably interfacing with switch assembly 50 which, in turn, is slidably mounted within a pair of tracks 154 and 156 formed in body assembly 32. Concurrently, detent finger 134 compressibly engages a selected one of a pair of detent notches 158 formed within a leg 160 of actuator 38. Thus, during this high beam—low beam pivoting movement of handle 36, detent finger 134 serves to temporarily maintain handle 36 in the high beam or low beam positions. Actuator 38 is injection molded from 43% glass reinforced type 6/6 nylon.

Receptacle segment 140 of actuator 38 has a cylindrical pin 170 extending from an exterior face 172 thereof and has an annular hollow 174 formed within an opposite exterior face 176. Actuator 38 is juxtaposed within turn signal cancellation mechanism 30 such that pin 170 extends through hole 90 of cover 34 and a cylindrical dowel 178, extending from body assembly 32, is positioned within annular hollow 174. Therefore, actuator 38 is pivotably journalled between cover 34 and body assembly 32. To aid in centering and dampening the pivotal movement of actuator 38, a trough 180 is formed within exterior face 172 of receptacle segment 140. Trough 180 has a substantially semi-circular configuration surrounding pin 170. A cancel return spring 182 is placed within trough 180 such that each end 184 of spring 182 compressibly abuts against the adjacent pillar 102, extending from cover 34, which cooperatively projects into trough 180. Cancel return spring 182 also serves to prevent actuator 38 from cross cancelling. Furthermore, cancel return spring 182 is a compression spring made from music wire per ASTM A228.

Extension arm segment 144 of actuator 38 has a cylindrical pintle 190 extending in an offset manner therefrom. Pintle 190 movably engages a track 192 formed within an injection molded carrier 194 of turn signal contactor and carrier assembly 44. This can best be seen in FIGS. 1, 3 and 8. Carrier 194 has a pair of elongated blades 196 which ride within linear pocket 88 of cover 34. A pair of spring loaded stamped contacts 198 are affixed upon carrier 194 and move between a series of adjacent current carrying stampings 74 mounted within body assembly 32. Accordingly, when handle 36 is pivoted to a left turn position, actuator 38 moves turn signal contactor and carrier assembly 44 which, in turn, closes an electrical circuit thereby allowing an intermittent supply of electrical current to flow to the left turn signal lamp (not shown). Conversely, when handle 36 is pivoted to a right turn position, actuator 38 moves turn signal contactor and carrier assembly 44 in an opposite linear position so as to complete the electrical circuit and allow electric current to intermittently actuate a right turn signal lamp (not shown).

As is shown in FIGS. 1, 3, 5 and 6, turn signal detent assembly 46 is comprised of a compression spring 200, a beam 202, a mandrel 204, a spindle 206, and a wheel 208. Wheel 208 is rotatably mounted upon spindle 206 which, in turn, is fastened within a forcated end 21 0 of beam 202. Furthermore, beam 202 and spring 200 are slidably juxtapositioned within a hollow chamber 212 formed centrally within platform segment 142 of actuator 38. Mandrel 204 integrally protrudes from beam 202 for engagement with pawl 40. Turn signal detent assembly 46 is configured to interface with a single detent formation 220 having a deep V-shaped central notch 222 which defines the neutral detent position, a shallow V-shaped upper notch 224 which defines the left turn detent position, and a shallow V-shaped lower notch 226 which defines the right turn detent position. Detent formation 220 is retained to body assembly 32 by a pair of opposing grooved ribs 228 and 230. Detent formation 220 is preferably made from a lubricous polymeric material such as an acetal resin. Also, spring 200 is made from music wire per ASTM A228, beam 202 is made from a moly impregnated type 6/6 nylon, spindle 206 is made from a machinable grade brass alloy and wheel 208 is made from a machinable grade brass alloy.

As can best be observed in FIG. 4, a modified T-shaped slot 230 is created within engagement segment 146 of actuator 38 and is defined by an inner edge 232 thereabout. This modified T-shaped slot 230 has a pair of oppositely extending upper legs 234 and 236 and a center leg 238 which is oriented toward receptacle segment 140. Upper legs 234 and 236 have a substantially arcuate shape and center leg 238 has a substantially triangular shape with its apex being angled toward pin 170.

Figure 6:
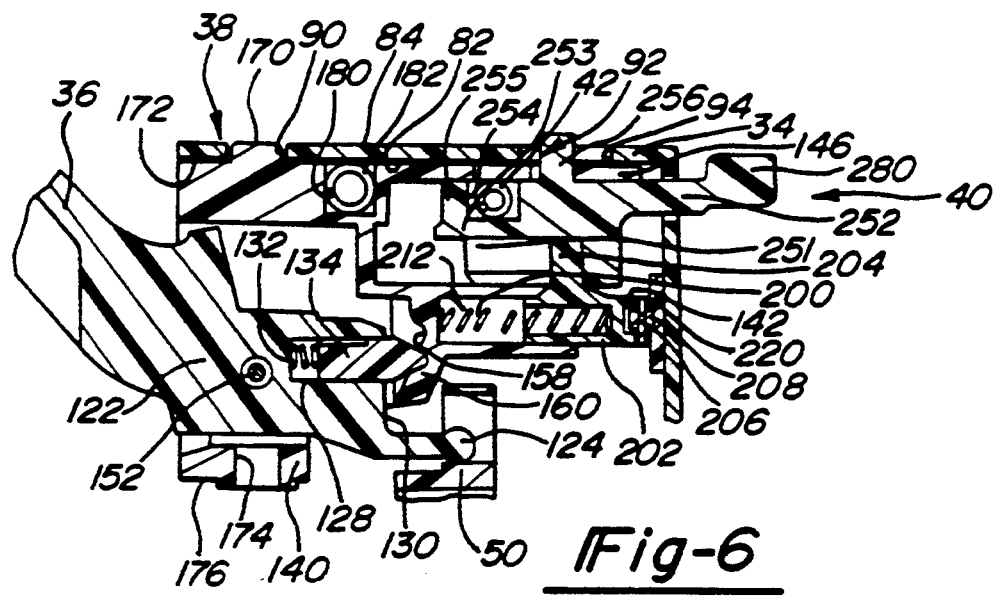
FIG. 6 is a sectional view, taken along line 6—6 of FIG. 4, of the present invention turn signal cancellation mechanism.
Figure 7:
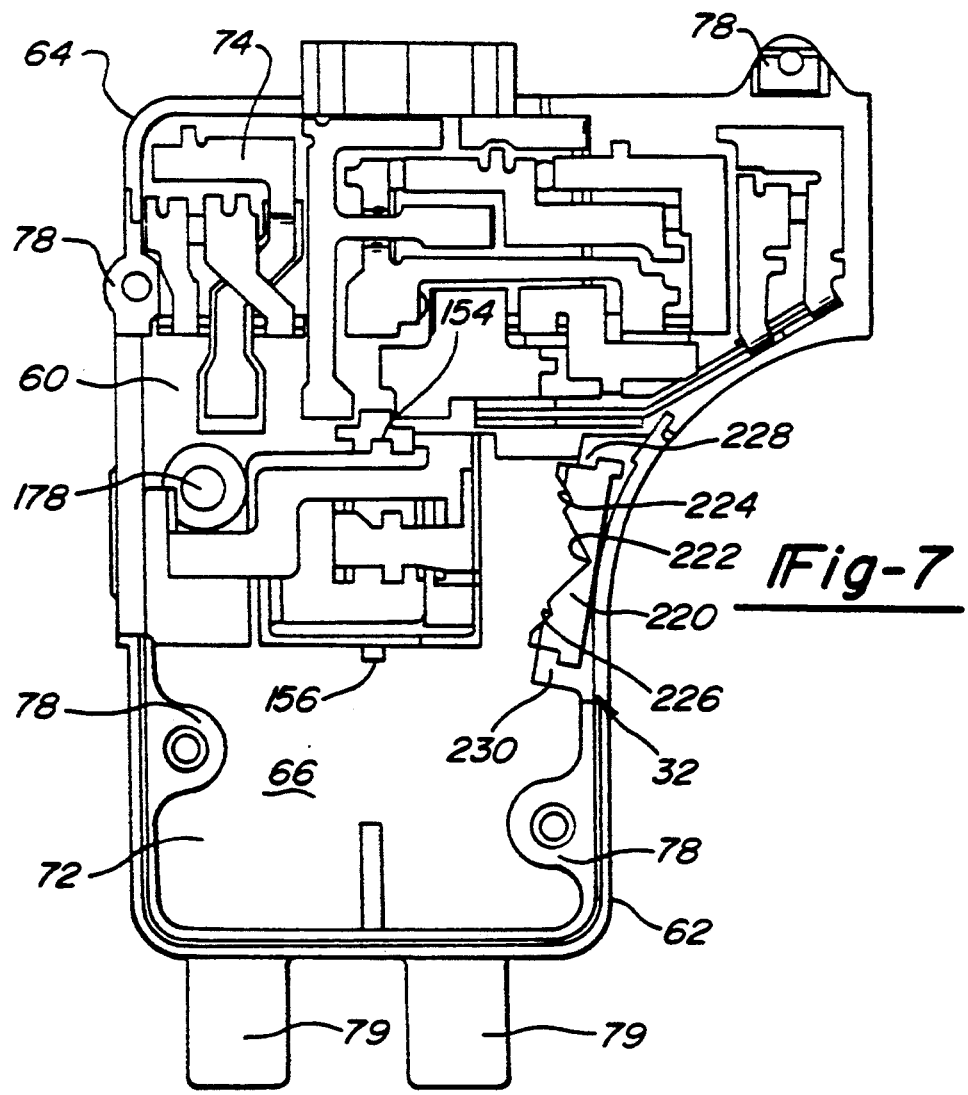
FIG. 7 is a side elevational view of the present invention turn signal cancellation mechanism of FIG. 1 showing the inside of the body assembly with a detent formation installed therein.

The specific structure of pawl 40 is best shown in FIGS. 5, 6 and 9. Pawl 40 has a base 250 comprised of a V-shaped support 251 and a ledge 253 upon which an arm 252 projects in an offset fashion therefrom. A channel 254 runs transversely across ledge 253 between a stubshaft 255 and arm 252. Furthermore, a post 256 extends perpendicularly from a triangular face 258 of arm 252. Post 256 is defined by a first four lateral surfaces 260, 262, 264 and 266. First lateral surface 260 is substantially parallel in orientation with second lateral surface 262, however, first lateral surface 260 has a greater width than does second lateral surface 262. Each pair of lateral surfaces 260, 262, 264 and 266 are joined together by rounded corners 268 therebetween and by a transverse surface 270 defining a distal end thereof. Additionally, arm 252 has an interface member 280 proximate with the distal end thereof. Interface member 280 has a head 282 which longitudinally extends away from base 250 and also has a foot 284 which is oriented toward post 256. Head 282 has a pair of lateral faces 286 and 288 which are inwardly angled toward one another such that an apex 290 created therebetween points away from base 250 and has a radius thereupon. Similarly, foot 284 of interface member 280 is defined by a pair of lateral faces 292 and 294 which are angled inward toward one another thereby creating a radiused apex 296. Pawl 40 is preferably injection molded as one piece from a type 6/6 nylon.

Pawl 40 is positioned between platform segment 142 and engagement segment 146 of actuator 38 with support 251 of pawl 40 being slidably adjacent to platform segment 142 and with triangular face 258 of arm 252 being slidably adjacent to engagement segment 146. Accordingly, post 256 engagably extends through modified T-shaped slot 230 of actuator 38 and through elongated slot 92 of cover 34. Elongated slot 92 of cover 34 provides linear guidance to pawl 40 throughout the actuation thereof. Furthermore, extension spring 42 has a center portion 300 which is located within channel 254 of pawl 40 such that a pair of coiled ends 302 are each wrapped around the adjacent biasing means attachment structure 100. Extension spring 42 is helically wound and is made from music wire per ASTM A228. Pawl 40 is urged outward, away from actuator 38, through mandrel 204 of turn signal detent assembly 46 operably pushing outward against V-shaped support 251 of base 250. In an alternate embodiment, as is shown in FIGS. 17 and 18, extension spring 42 (see FIG. 1) may be replaced by a metallic leaf spring 420. It may also be desirable to place a lubricant between many of the moving mechanical components within turn signal cancellation mechanism 30.

The detailed operation of turn signal cancellation mechanism 30 in relation to a steering shaft assembly 400 is shown in FIGS. 10 through 16. Steering shaft assembly 400 is comprised of a steering shaft 402 and a cancel cam 404 affixed therearound. Cancel cam 404 further has a pair of raised buttress formations 406 and 408 separated by a recessed formation 410. FIG. 10 shows actuator 38, pawl 40 and extension spring 42 positioned in a neutral orientation in relation to steering shaft assembly 400. Steering shaft assembly 400 and cancel cam 404 are orientated in a straight and unturned position aligned with the automotive vehicle body. In FIG. 11, actuator 38 is positioned in a detented left turn position relative to steering shaft assembly 400 which is oriented in a straight and unturned position. Accordingly, pawl 40 is projected outward away from actuator 38 by movement of mandrel 204 (see FIG. 6) of turn signal detent assembly 46 (see FIG. 6) thereby translating post 256 from center leg 238 of modified T-shaped slot 230 to a position proximate with upper leg 236. Simultaneously, extension spring 42 is extended. FIG. 12 illustrates actuator 38 in a left turn position and pawl 40 in an extended position. However, steering shaft assembly 400 has been rotated counterclockwise to a sharp left turn position wherein buttress formation 406 forces interface segment 280 into a downwardly tipped attitude. FIG. 13 shows turn signal cancellation mechanism 30 in a similar position to that of the preceding figure, nevertheless, pawl 40 is allowed to return to its projected nominal attitude. In FIG. 14, steering shaft assembly 400 has been rotated clockwise toward its straightened position wherein buttress formation 408 of cancel cam 404 causes interface member 280 to tip pawl 40 in a slightly upward direction. FIG. 15 shows actuator 38, extension spring 42 and pawl 40 in their neutral positions after cancel cam 404 has caused post 256 to return to its retracted position proximate with center leg 238 of modified T-shaped slot 230. Cancel cam 404 is now shown slightly rotated clockwise to a gentle right turn position. Referring to FIG. 16, actuator 38 is positioned between the detented left turn orientation and the neutral orientation such that pawl 40 bypasses the cancellation function of cancel cam 404 which is still rotated in the gentle right turn position. This bypass actuation is provided by lateral face 286 abutting against buttress formation 406 and then veering below buttress formation 406. While FIGS. 17 and 18 are similar to FIGS. 10 and 13, leaf spring 420 is used in place of extension spring 42 (see FIG. 10).

Referring to FIGS. 19 and 20, an alternate embodiment pawl 450 of the present invention turn signal cancellation mechanism 30 is shown. The primary feature of this alternate embodiment is that an arm 452 is separated from a base 454. Arm 452 is defined by a first longitudinal face 456 and a second and opposite longitudinal face 458 which are both bordered by a peripheral edge 460. Longitudinal faces 456 and 458 have an elongated aperture 462 formed therethrough which is defined by an inner surface 464 therearound. Arm 452 further has an abutting surface 466 juxtapositioned on an opposite end from an interface segment 468. Thus, elongated aperture 462 creates a yoke-type formation 470. Base 454 has a V-shaped support 471 and a ledge 472 mounted thereupon with a pair of raised guides 474 protruding therefrom. An elongated island 480 is located upon ledge 472 between guides 474 and has a cylindrical post 482 projecting therefrom. Island 480 and guides 474 are each separated from one another by a pair of longitudinal grooves 484. Elongated aperture 462 and yoke 470 slidably surround a transverse portion 490 of island 480 such that peripheral edge 460 is slidably contained within longitudinal grooves 484 between guides 474. Moreover, a pair of stub-shafts 492 protrude from ledge 472 such that a channel 494 is formed between stub-shafts 492 and guides 474. An extension spring 500 (see FIG. 21) is placed within channel 494 similar to the preferred embodiment. Therefore, arm 452 is extendable and retractable along the longitudinal direction within longitudinal grooves 484 by abutting end 466 of arm 452 compressibly interfering with extension spring 500 (see FIG. 21). Also, interface segment 468 has a head 502 which has a flat shape and a foot 504 which is shaped similar to that of the preferred embodiment.

Figure 24:
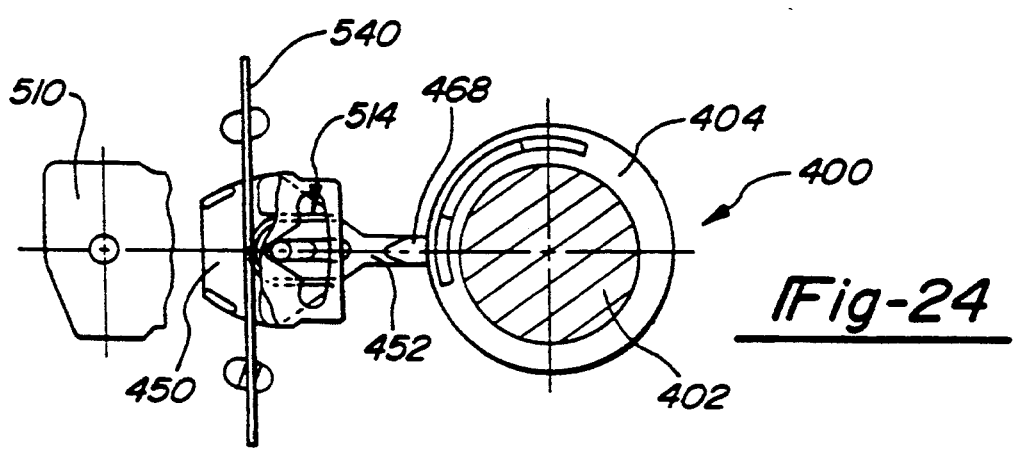
FIGS. 24–25 are elevational views, similar to FIGS. 10–16, of the alternate embodiment pawl of FIG. 19 in combination with the alternate embodiment spring of FIG. 17 of the present invention turn signal cancellation mechanism showing exemplary operating positions thereof.
Figure 25:
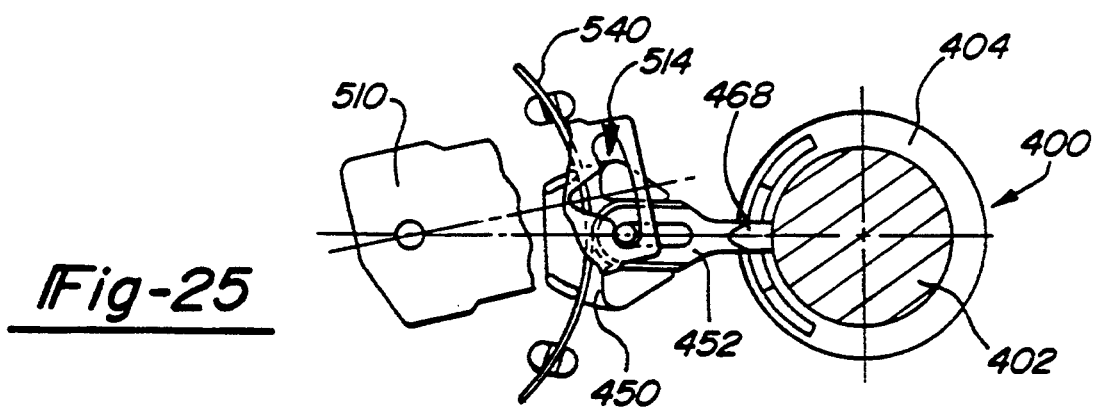

FIG. 21 shows an actuator 510, pawl 450 and extension spring 500 positioned in a neutral orientation in relation to steering shaft assembly 400. Steering shaft assembly 400 and cancel cam 404 are orientated in a straight and unturned position aligned with the automotive vehicle body. In FIG. 22, actuator 510 is positioned in a detented left turn position relative to steering shaft assembly 400 which is oriented in a straight and unturned position. Accordingly, pawl 450 is projected outward away from actuator 510 by extension spring 500 which causes movement of post 482 from a center leg 512 of a modified T-shaped slot 514 to a position proximate with an upper leg 516. In FIG. 23, actuator 510 is positioned between the detented left turn orientation and the neutral orientation such that pawl 450 bypasses the cancellation function of cancel cam 404 which has been slightly rotated clockwise to a gentle right turn position. Such a bypass is provided by post 482 being moved from center leg 512 to upper leg 514 of modified T-shaped slot 516 while the separate arm 452 is linearly retracted. Accordingly, abutting segment 466 of arm 452 compresses against extension spring 500. Simultaneously, head 502 of interface segment 468 abuts against buttress formation 406 of cancel cam 404. A leaf spring 540 is alternately shown replacing extension spring 500 (see FIG. 21) in FIGS. 24 and 25.

While various embodiments of this turn signal cancellation mechanism have been disclosed, it will be appreciated various modifications may be made without departing from the present invention. For example, a turn signal switch assembly may use solid state components or the like in place of the aforementioned mechanical carrier and stamped contacts. Furthermore, a handle may have an actuator formed directly therein if a high beam—low beam switch is not coupled thereto. Moreover, a body assembly and cover may be directly integrated into an aesthetic cover surrounding a steering shaft assembly. Various materials have been disclosed in an exemplary fashion, however, a variety of other materials may of course be employed. It is intended by the following claims to cover these and any other departures from the disclosed embodiments which fall within the true spirit of this invention.

The invention claimed is:

1. A turn signal cancellation mechanism for interfacing with an automotive vehicle steering shaft assembly, said turn signal cancellation mechanism comprising:

a handle;

an actuator having an engagement segment extending therefrom, said engagement segment having a modified T-shaped slot formed therein defined by an inner edge thereabout with said modified T-shaped slot having a pair of oppositely extending upper legs and a center leg protruding substantially perpendicular therefrom, said pair of upper legs being orientated transversely across said engagement segment and said center leg being orientated toward said handle, said handle being affixed to said actuator;

a pawl having a base and an arm projecting therefrom and also having a channel running transversely thereacross, said arm further having a post mounted perpendicular thereto and an interface member proximate with a distal end thereof, said pawl being positioned with a predetermined portion of said arm having said engagement segment slidably adjacent thereagainst such that said post of said pawl engagably extends through said modified T-shaped slot of said actuator; and a biasing means for urging said pawl into movable engagement with preselected portions along said legs of said modified T-shaped slot of said actuator, said biasing means being partially juxtapositioned within said channel of said pawl.

2. The turn signal cancellation mechanism of claim 1 further comprising:

a cancel cam being attached to said steering shaft assembly and rotating coincidental therewith, said cancel cam having a pair of buttress formations separated by a recessed formation therebetween; and said interface member of said pawl being pivotably movable by contact with said buttress formations of said cancel cam thereagainst.

3. The turn signal cancellation mechanism of claim 2 wherein:

said handle pivotably moves said actuator in relation to said steering shaft assembly and said cancel cam attached thereto.

4. The turn signal cancellation mechanism of claim 3 wherein:

said post of said pawl is engagably moved to a position within one of said upper legs of said modified T-shaped slot of said actuator when said handle and said actuator are in a pivoted position, simultaneously, said interface member of said pawl is forced to project outward away from said actuator; and one of said buttress formations of said cancel cam rotatably pushes said interface member of said pawl toward a tipped position thereby causing said post of said pawl to slide out of engagement with one of said pair of upper legs of said modified T-shaped slot and then slide down said inner edge defining said center leg of said modified T-shaped slot whereby said pawl is urged to return to its retracted position.

5. The turn signal cancellation mechanism of claim 1 further comprising:

a cover having an inner surface and an outer surface with an elongated slot created at least partially therethrough, said elongated slot being defined by an inside edge therearound, said cover further having said actuator pivotably coupled thereto such that a predetermined portion of said handle extends outward therepast, said engagement segment of said actuator being slidably adjacent to said inner surface of said cover such that said post of said pawl engagably protrudes within said elongated slot of said cover.

6. The turn signal cancellation mechanism of claim 5 further comprising:

said biasing means having a pair of attachment ends thereof; and a pair of biasing means attachment structures being mounted upon said inner surface of said cover partially bordering said actuator thereabout, said pair of attachment ends of said biasing means being fastened to said pair of attachment structures.

7. The turn signal cancellation mechanism of claim 5 further comprising:

a cancel return spring being positioned within a semicircular groove formed within said receptacle segment of said actuator, said cancel return spring being defined as a compression spring with a pair of ends thereof, said ends of said cancel return spring being compressible by a pair of pillars extending from said inner surface of said cover, said cancel return spring centering said handle and said actuator when released from interfacing with said steering shaft assembly.

8. The turn signal cancellation mechanism of claim 1 wherein:

said interface member of said pawl has a head which longitudinally extends away from said base and also has a foot defined by a pair of first lateral faces which are inwardly angled such that an apex created by said first lateral faces thereof is oriented toward said base.

9. The turn signal cancellation mechanism of claim 8 wherein:

said head of said interface member of said pawl has a second pair of lateral faces thereto which are inwardly angled toward one another, a second apex created therebetween is oriented away from said base and said second apex of said head has a radius thereupon.

10. The turn signal cancellation mechanism of claim 1 wherein:

said biasing means is a helically wound extension spring.

11. The turn signal cancellation mechanism of claim 1 wherein:

said biasing means is a metallic leaf spring.

12. The turn signal cancellation mechanism of claim 1 wherein:

said pair of upper legs of said modified T-shaped slot within said actuator are substantially arcuate in shape thereof, said center leg of said modified T-shaped slot is substantially triangular in peripheral shape with said inner edge thereabout being angled outward toward said pair of upper legs adjacent thereto.

13. The turn signal cancellation mechanism of claim 1 wherein:

said post of said pawl has four lateral surfaces thereabout bordered by a transverse surface at an end thereof opposite from said arm, said four lateral surfaces are substantially trapezoidal in relation to each other with rounded corners at the intersections therebetween, a first of said four lateral surfaces of said post faces said interface member and has a greater width than a second of said four lateral surfaces positioned opposite therefrom, said second of said four lateral surfaces is substantially parallel with said first of said four lateral surfaces.

14. The turn signal cancellation mechanism of claim 1 wherein:

said base, said arm, said interface member, and said post of said pawl are integrally formed as one piece.

15. The turn signal cancellation mechanism of claim 1 further comprising:

said arm of said pawl being a separate piece from said base, said arm being defined by a first longitudinal face and a second and opposite longitudinal face bordered by a peripheral edge thereabout, said first and second longitudinal faces having an elongated aperture therethrough defined by an inner surface therearound, said arm further having an abutting surface juxtapositioned opposite from said interface member;

a pair of raised guides mounted upon said base and being positioned adjacent with said engagement surface of said actuator, an elongated island mounted upon said base between said pair of guides with said post projecting therefrom, said island and said pair of guides being separated from one another by a pair of longitudinal grooves running therebetween; and said elongated aperture of said arm slidably surrounding a transverse portion of said island internally thereto such that said peripheral edge around said arm is slidably contained within said pair of longitudinal grooves between said pair of guides, said arm extending and retracting in the longitudinal direction thereof within said pair of grooves such that said abutting end of said arm compressibly interferes with said biasing means thereagainst.

16. The turn signal cancellation mechanism of claim 1 wherein:

said post of said pawl has a cylindrically-shaped lateral surface therearound bordered by a distal end thereof.

17. The turn signal cancellation mechanism of claim 1 further comprising:

a turn signal detent assembly being compressibly mounted to said actuator; and a single detent formation having a plurality of positional notches therein being engagable with said turn signal detent assembly to temporarily retain said actuator and said handle in a selected left turn, neutral or right turn pivoted position.

18. A turn signal cancellation mechanism for interfacing with an automotive vehicle steering shaft assembly, said turn signal cancellation mechanism comprising:

a handle having a stalk portion and a coupling portion;

an actuator having a receptacle segment with a platform segment and an engagement segment extending therefrom spatially disposed from one another and having a planar orientation substantially parallel to one another, said engagement segment having a modified T-shaped slot formed therein defined by an inner edge thereabout with said modified T-shaped slot having a pair of oppositely extending upper legs and a center leg protruding substantially perpendicular therefrom, said pair of upper legs being orientated transversely across said engagement segment and said center leg being orientated toward said receptacle segment, said coupling portion of said handle being affixed to said receptacle segment of said actuator;

a pawl having a base and an arm projecting therefrom and also having a channel running transversely thereacross, said arm having a post mounted perpendicular thereto and an interface member proximate with a distal end thereof, said pawl being slidably positioned between said platform segment and said engagement segment of said actuator such that said post of said pawl engagably extends through said modified T-shaped slot of said actuator;

a cover having an inner surface and an outer surface with an elongated slot created at least partially therethrough defined by an inside edge therearound, said cover further having said actuator pivotably coupled thereto such that said stalk of said handle extends outward therepast, said engagement segment of said actuator being slidably adjacent to said inner surface of said cover such that said post of said pawl engagably protrudes within said elongated slot of said cover; and a biasing means for urging said pawl into movable engagement with preselected portions along said legs of said modified T-shaped slot of said actuator, said biasing means being partially juxtapositioned within said channel of said pawl.

19. The turn signal cancellation mechanism of claim 18 wherein:

said interface member of said pawl has a head which longitudinally extends away from said base and also has a foot defined by a pair of first lateral faces which are inwardly angled such that an apex created by said first lateral faces thereof is oriented toward said base.

20. The turn signal cancellation mechanism of claim 18 wherein:

said head of said interface member of said pawl has a second pair of lateral faces thereto which are inwardly angled toward one another, a second apex created therebetween is oriented away from said base and said second apex of said head has a radius thereupon.

21. The turn signal cancellation mechanism of claim 18 wherein:

said pair of upper legs of said modified T-shaped slot within said actuator are substantially arcuate in shape thereof, said center leg of said modified T-shaped slot is substantially triangular in peripheral shape with said inner edge thereabout being angled outward toward said pair of upper legs adjacent thereto.

22. The turn signal cancellation mechanism of claim 18 wherein:
said post of said pawl has four lateral surfaces thereabout bordered by a transverse surface at an end thereof opposite from said arm, said four lateral surfaces are substantially trapezoidal in relation to each other with rounded corners at the intersections therebetween, a first of said four lateral surfaces of said post faces said interface member and has a greater width than a second of said four lateral surfaces positioned opposite therefrom, said second of said four lateral surfaces is substantially parallel with said first of said four lateral surfaces.

23. The turn signal cancellation mechanism of claim 18 wherein:
said base, said arm, said interface member, and said post of said pawl are integrally formed as one piece.

24. The turn signal cancellation mechanism of claim 18 further comprising:
said arm of said pawl being a separate piece from said base, said arm being defined by a first longitudinal face and a second and opposite longitudinal face bordered by a peripheral edge thereabout, said first and second longitudinal faces having an elongated aperture therethrough defined by an inner surface therearound, said arm further having an abutting surface juxtapositioned opposite from said interface member;
a pair of raised guides mounted upon said base and being positioned adjacent with said engagement surface of said actuator, an elongated island mounted upon said base between said pair of guides with said post projecting therefrom, said island and said pair of guides being separated from one another by a pair of longitudinal grooves running therebetween; and
said elongated aperture of said arm slidably surrounding a transverse portion of said island internally thereto such that said peripheral edge around said arm is slidably contained within said pair of longitudinal grooves between said pair of guides, said arm extending and retracting in the longitudinal direction thereof within said pair of grooves such that said abutting end of said arm compressibly interferes with said biasing means thereagainst.

25. A turn signal cancellation mechanism for interfacing with an automotive vehicle steering shaft assembly, said turn signal cancellation mechanism comprising:
a handle having a stalk portion and a coupling portion;
an actuator having a receptacle segment with a platform segment and an engagement segment extending therefrom spatially disposed from one another and having a planar orientation substantially parallel to one another, said engagement segment having a modified T-shaped slot formed therein defined by an inner edge thereabout with said modified T-shaped slot having a pair of oppositely extending upper legs and a center leg protruding substantially perpendicular therefrom, said pair of upper legs being orientated transversely across said engagement segment and said center leg being orientated toward said receptacle segment, said pair of upper legs of said modified T-shaped slot within said actuator being substantially arcuate in shape thereof, said center leg of said modified T-shaped slot being substantially triangular in peripheral shape with said inner edge thereabout being angled outward toward said pair of upper legs adjacent thereto, said coupling portion of said handle being affixed to said receptacle segment of said actuator;
a pawl having a base and an arm projecting in an offset fashion therefrom and also having a channel running transversely thereacross, said arm having a post mounted perpendicular thereto on a face opposite from said base, said post of said pawl has four lateral surfaces thereabout bordered by a transverse surface at an end thereof opposite from said arm, said four lateral surfaces being substantially trapezoidal in relation to each other with rounded corners at the intersections therebetween, a first of said four lateral surfaces of said post facing said interface member and having a greater width than a second of said four lateral surfaces positioned opposite therefrom, said second of said four lateral surfaces being substantially parallel with said first of said four lateral surfaces, said arm further having an interface member proximate with a distal end thereof, said pawl being positioned between said platform segment and said engagement segment of said actuator with said base of said pawl having said platform segment slidably adjacent thereagainst and with a predetermined portion of said arm having said engagement segment slidably adjacent thereagainst such that said post of said pawl engagably extends through said modified T-shaped slot of said actuator;
a cover having an inner surface and an outer surface with an elongated slot created at least partially therethrough defined by an inside edge therearound, said cover further having said actuator pivotably coupled thereto such that said stalk of said handle extends outward therepast, said engagement segment of said actuator being slidably adjacent to said inner surface of said cover such that said post of said pawl engagably protrudes within said elongated slot of said cover, a pair of biasing means attachment structures also being mounted upon said inner surface of said cover partially bordering said actuator thereabout;
a biasing means for urging said pawl into movable engagement with preselected portions along said legs of said modified T-shaped slot of said actuator, said biasing means being partially juxtapositioned within said channel of said pawl and having a pair of attachment ends protruding externally thereof, said pair of attachment ends of said biasing means being fastened to said pair of attachment structures;
a cancel return spring being positioned within a semicircular groove formed within said receptacle segment of said actuator, said cancel return spring being defined as a compression spring with a pair of ends thereof, said ends of said cancel return spring being compressible by a pair of pillars extending from said inner surface of said cover, said cancel return spring centering said handle and said actuator when released from interfacing with said steering shaft assembly;
a turn signal detent assembly being mounted to said actuator; and
a single detent formation having a plurality of positional notches therein being engagable with said turn signal detent assembly to temporarily retain said actuator and said handle in a selected left turn, neutral or right turn pivoted position.

* * * * *